United States Patent [19]

Harder et al.

[11] 4,338,921
[45] Jul. 13, 1982

[54] SOLAR LIQUID HEATING SYSTEM

[75] Inventors: Willard J. Harder; James M. Pickett, both of Minneapolis, Minn.

[73] Assignee: Bethany Fellowship, Inc., Minneapolis, Minn.

[21] Appl. No.: 116,783

[22] Filed: Jan. 30, 1980

[51] Int. Cl.³ .............................................. F24J 3/02
[52] U.S. Cl. .................................. 126/446; 126/417; 126/447; 126/449; 126/450; 126/435
[58] Field of Search ............... 126/417, 446, 447, 448, 126/450, 432, 435; 165/183, 171, 173

[56] References Cited

U.S. PATENT DOCUMENTS

| D. 243,246 | 2/1977 | England | D26/1 R |
|---|---|---|---|
| 2,736,406 | 2/1956 | Johnson | 165/171 X |
| 2,944,138 | 7/1960 | Goff | 219/34 |
| 2,987,300 | 6/1961 | Greene | 165/169 |
| 3,448,798 | 6/1969 | Coe | 165/168 |
| 3,980,071 | 9/1976 | Barber, Jr. | 126/447 |
| 3,982,527 | 9/1976 | Cheng et al. | 126/438 |
| 3,995,615 | 12/1976 | Hojnowski | 126/444 |
| 4,019,496 | 4/1977 | Cummings | 126/441 |
| 4,046,135 | 9/1977 | Root et al. | 126/441 |
| 4,060,070 | 11/1977 | Harter | 126/447 |
| 4,086,913 | 5/1978 | Gavin | 165/171 X |
| 4,164,935 | 8/1979 | Marles et al. | 126/447 |
| 4,170,221 | 10/1979 | Gavin | 126/446 |
| 4,180,055 | 12/1979 | Hudnall | 165/171 X |
| 4,241,727 | 12/1980 | Toti | 126/446 |
| 4,246,892 | 1/1981 | Waiche | 126/446 X |
| 4,248,210 | 2/1981 | Ortega | 126/446 X |

Primary Examiner—Larry Jones
Attorney, Agent, or Firm—Burd, Bartz & Gutenkauf

[57] ABSTRACT

A solar liquid heating system having a collector receiving solar energy and heating a liquid. A liquid transfer pump moves the heated liquid to a heat transfer tank which heats water. The collector has a plate assembly mounted on a frame. Heat insulated bottoms, sides, and ends surrounded by the frame form an elongated chamber accommodating the plate assembly. The plate assembly has a plurality of side-by-side longitudinal plates. Adjacent plates have generally C-shaped sections that are located about a longitudinal tube for carrying liquid. Adjacent plates have lip and hook interconnecting structures that cooperate with each other to clamp the tube between the C-shaped sections of the plates. The opposite ends of the tubes are connected to transverse tubular headers. The headers project through resilient grommets mounted on the sides of the frame. The top sides of the plate assembly are coated with black solar energy absorbing material. A light transparent cover encloses the plate assembly within the chamber of the collector.

3 Claims, 10 Drawing Figures

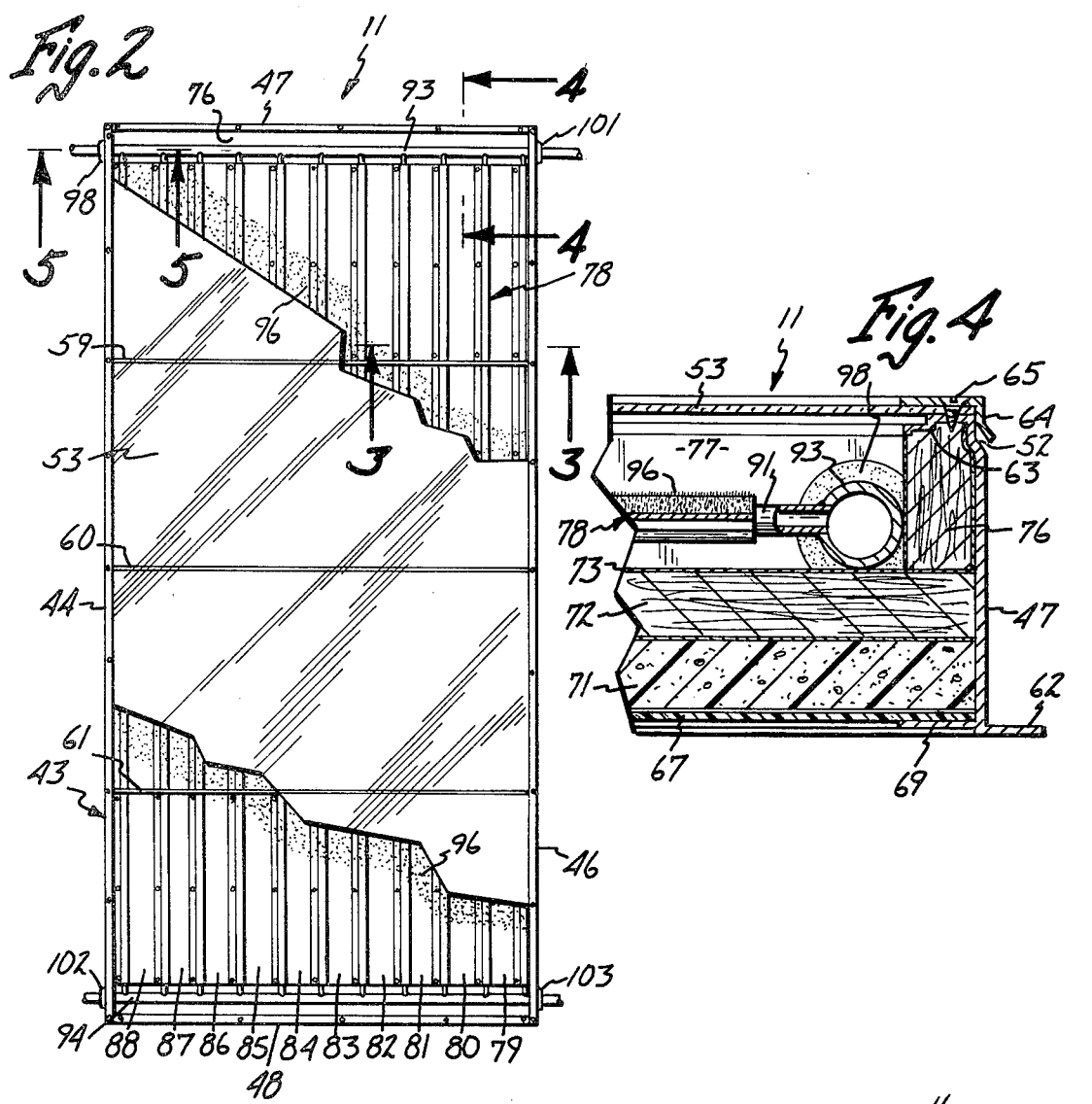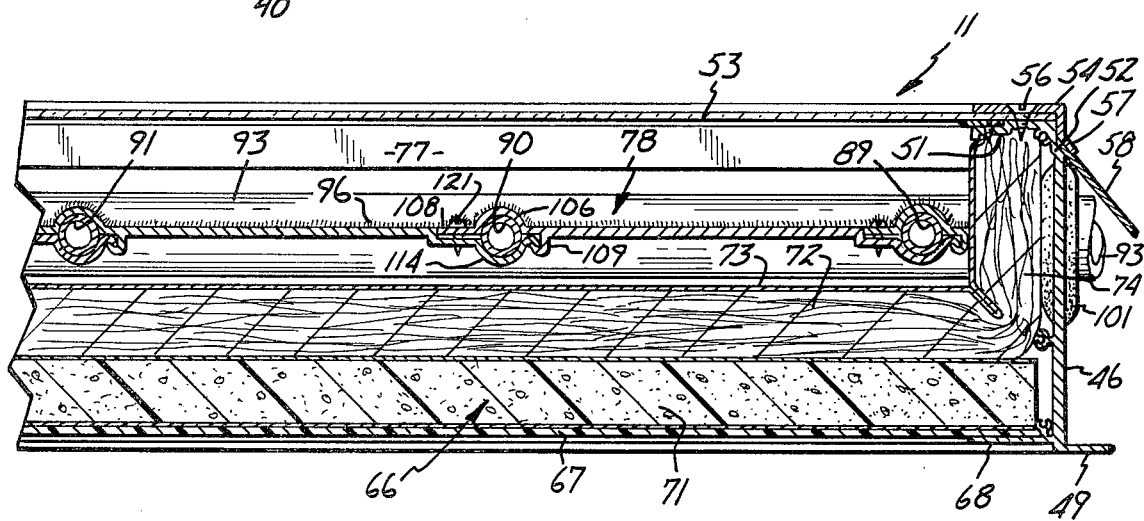

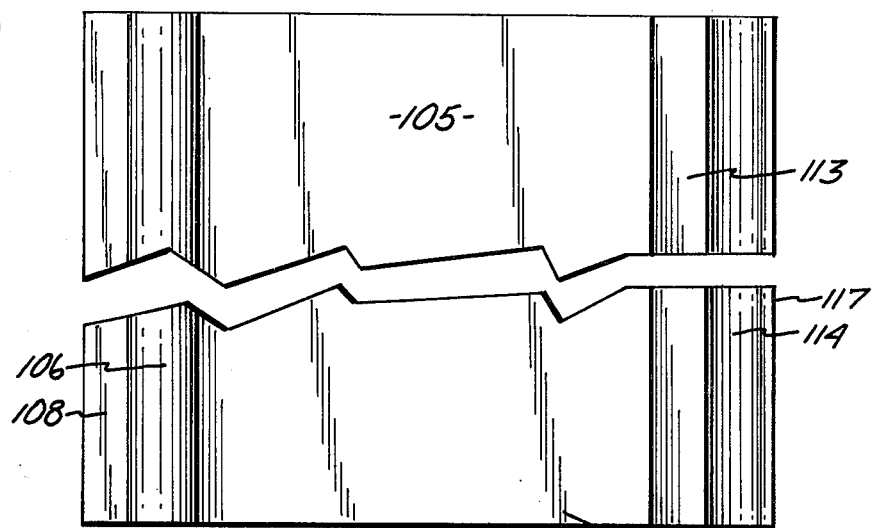
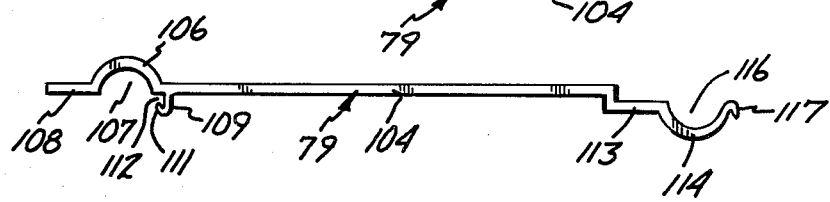
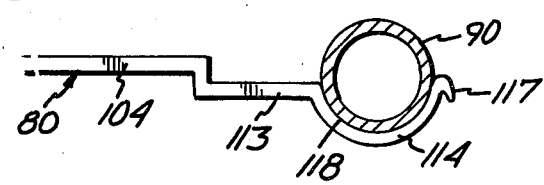
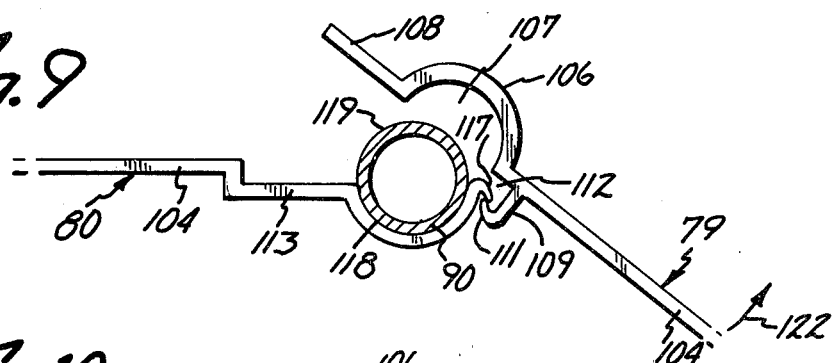
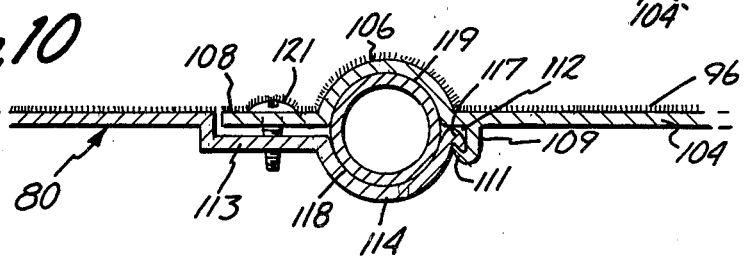

SOLAR LIQUID HEATING SYSTEM

SUMMARY OF THE INVENTION

The invention is directed to an apparatus for heating a liquid with solar energy and transferring the heated liquid to a heat transfer means for heating a fluid, as water or air. More specifically, the invention relates to a solar energy collector having a frame carrying heat insulating means. The heat insulating means surrounds a chamber. The top of the chamber is enclosed with a light transparent cover. Solar energy collecting means located in the chamber operates to collect solar energy and transfer heat to fluid carrying means, as tubes, to heat the fluid in said means. The solar energy collecting means has a plurality of longitudinal side-by-side plates that are connected together to form a plate assembly. Adjacent longitudinal sides of the plates have longitudinal C-shaped portions that are clamped about longitudinal tubes for carrying the liquid. Adjacent plates have cooperating lip and hook structures that articulately connect the plates and locate the C-shaped portions in surface engagement with the tubes. Fastening means secure adjacent plates together and hold the C-shaped members in tight surface engagement with the tubes. Opposite ends of the tubes are connected to transverse headers or manifolds used to carry the liquid to and from the opposite ends of the tubes of the plate assembly. The upper surface of the plate assembly is coated with a solar energy absorbent material to enhance solar energy collection efficiency.

The collector has a high energy collection efficiency and is durable in use. The collector is constructed of relatively lightweight material and is adaptable to numerous installations for heating liquids or gases. A plurality of collectors can be coupled together to form an array of collectors. The fluid circulating means is located in a central location to facilitate the operation and servicing of the solar liquid heating system. These and other advantages of the solar energy collector are embodied in the following detailed description of the invention and the drawings.

IN THE DRAWINGS

FIG. 2 is an enlarged top plan view with parts broken away of a solar collector of FIG. 1;

FIG. 3 is an enlarged sectional view taken along the line 3—3 of FIG. 2;

FIG. 4 is an enlarged sectional view taken along the line 4—4 of FIG. 2;

FIG. 6 is a foreshortened plan view of a plate of the solar collecting plate assembly of the collector of FIG. 2;

FIG. 7 is an end elevational view of FIG. 6; and

FIGS. 8, 9, and 10 are end elevational views of adjacent plates and liquid carrying tube showing the assembly of the plates about the tube and connecting the adjacent plates together.

DESCRIPTION OF PREFERRED EMBODIMENT

Figure 1:
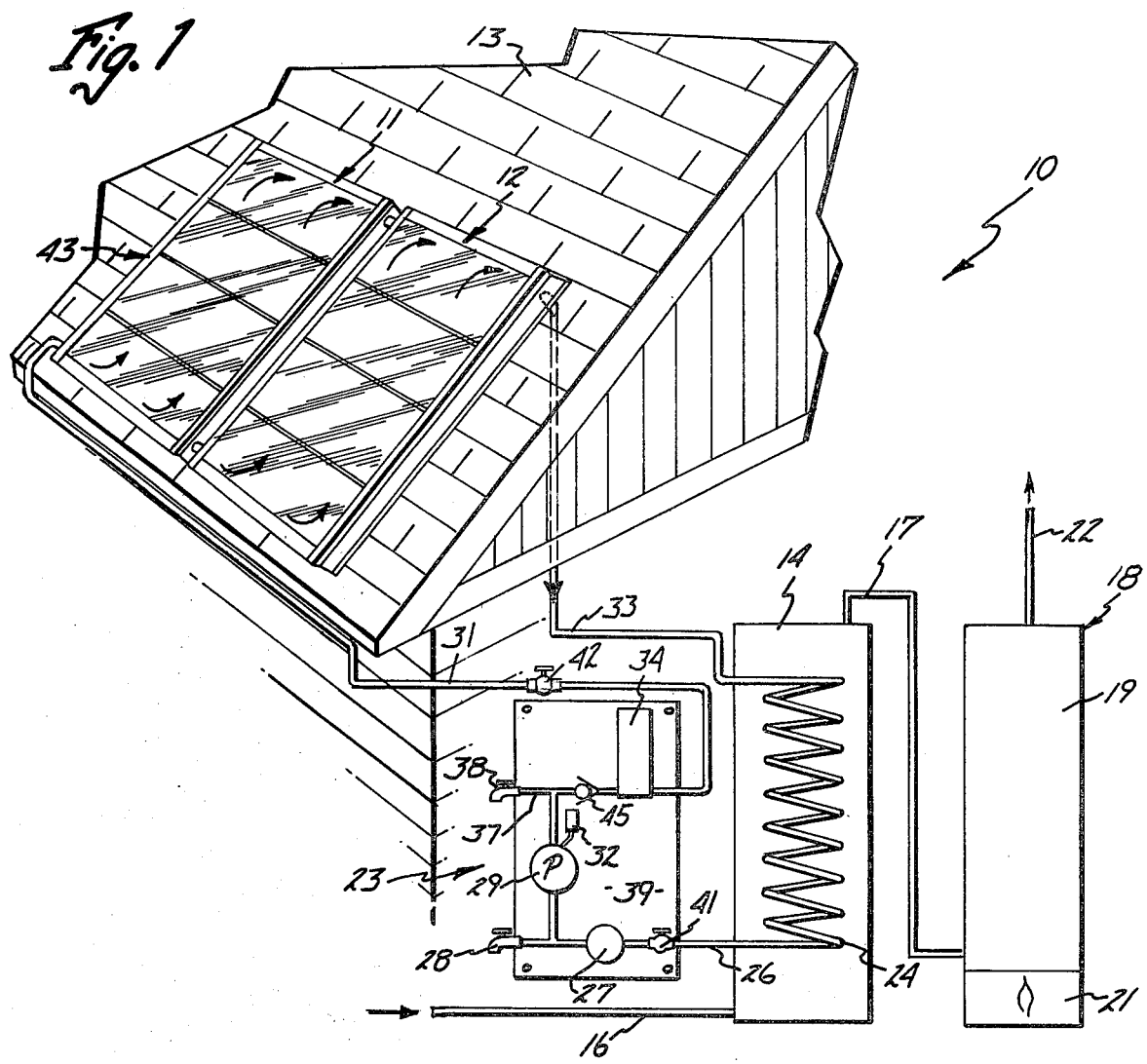
FIG. 1 is a diagrammatic view of the solar energy collecting system having the collectors of the invention.

Referring to FIG. 1, there is shown a solar liquid heating system indicated generally at 10. The heating system 10 is operable to provide hot water for residential and commercial applications. Solar liquid heating system 10 has a pair of solar collectors 11 and 12 located on an inclined roof 13 of a structure, such as a house or building. Collectors 11 and 12 can be mounted on separate supports, as a wall mount, free stands, and the like, and are preferably inclined at an angle of latitude plus 10 degrees and face in the direction of the sun. The collectors 11 and 12 are inclined to provide maximum solar energy collection efficiency. The angle of the collectors 11 and 12 depends on the latitude location of the heating system 10. The maximum solar energy collection efficiency angle of the collectors varies in accordance with the North-South location of the collectors. The number of collectors can be increased in accordance with the amount of water to be heated and the geographic location in which the collectors are used.

Collectors 11 and 12 supply heated liquid, as water mixed with ethylene glycol, or a liquid that does not freeze in adverse cold weather, to a heat exchange and storage tank 14 which transfers heat to water located in the tank. An inlet pipe 16 connected to a source of water delivers water to the bottom of tank 14. Hot water flows from tank 14 through an outlet pipe 17 connected to a conventional hot water heater indicated generally at 18. Heater 18 has an insulated tank 19 and a bottom burner 21. Burner 21 can be a gas burner or the water in the tank can be electrically heated. The hot water flows from tank 19 through the hot water pipe 22 for distribution throughout the residence. Tank 14 can be replaced with a heat transfer means, as a radiator, for heating a gas, as air. The heat transfer means can be used to heat material, as rocks, in a heat storage means.

A fluid circulating means indicated generally at 23 functions to move liquid through collectors 11 and 12 and a heat transfer coil 24 located in tank 14. A fluid outlet pipe 26 is connected to the bottom of coil 24. Pipe 26 is connected to an on-off isolation valve 41, a pressure relief valve 27, and a drain cock 28. A pump 29 moves fluid from pipe 26 to a collector inlet pipe 31. Pipe 31 extends to one end of the lower manifold of collector 11. Pump 29 is driven with an electric motor connected to a motor control 32. Control 32 functions in response to the temperature differential between the fluid in collectors 11 and 12 and the water in tank 14. For example, if the temperature of the fluid in collectors 11 and 12 is 4 degrees above the temperature of the water in tank 14, pump 29 operates to supply the warmer fluid to coil 24 in tank 14. The greater the temperature differential between the fluid in collectors 11 and 12 and the water in tank 14, the faster pump 29 operates to supply hot fluid to coil 24.

A fluid expansion tank 34 is connected to collector inlet line 31 to accommodate pressure surges and excess fluid pressure in the system. A short drain pipe 37 closed with a drain cock 38 is connected to pipe 33 adjacent the outlet of pump 29. A oneway or check valve 45 is located in line 33 between pump 29 and tank 34. Hot fluid flows from the upper headers of collectors 11 and 12 to the top of coil 24 to complete the fluid circuit. Relief valve 27, pump 29, motor control 32, and tank 34 are all mounted on a support or board 39 so that all of the parts and controls are conveniently located and can be readily installed. On-off valves 41 and 42 located in lines 26 and 33, respectively, are also mounted on board 39. Additional on-off valves can be added to pipes 31 and 33.

Referring to FIG. 2, collector 11 has a rectangular housing or frame indicated generally at 43 comprising longitudinal side members 44 and 46 connected at their opposite ends to transverse end members 47 and 48. As shown in FIG. 3, side member 46 has an outwardly directed foot or flange 49 adapted to be attached to a support, such as roof 13. The upper end of side member 44 has an inwardly directed lip 51 and an inwardly directed shoulder 52. The corresponding parts of side member 44, shown in FIG. 5, have the same reference numbers with the suffix A. A light transparent sheet member or cover 53 is clamped onto lip 51 with a right angle bar. Fasteners, such as screws 56, and an adhesive secure the outer edge of cover 53 to lip 51 and right angle bar 54 to prevent water, snow, and foreign material from entering the collector.

Bar 54 has an outwardly directed flange 57 spaced from shoulder 52 providing a groove for a downwardly directed flashing 58. Cover 53 extends between side members 54 and 56 and end members 57 and 58. A plurality of transverse cross members 59, 60, and 61 support the mid-portion of cover 53. Cover 53 is a sheet member having light transmission characteristics, as a plastic reinforced with glass fibers, glass, or the like.

End member 47 has an outwardly directed flange 62 which allows member 47 to be secured to roof 13. The upper end of member 47 has an inwardly directed lip 63 located under the end of cover 53. A right angle bar 64 and screw 65 clamp cover 53 to lip 63. A sealant is interposed between bar 64 and cover 53 to prevent water from entering the collector.

Collector 11 has a flat bottom indicated generally at 66. The bottom comprises a plastic board 67, such as a plastic fiber reinforced sheet, secured with adhesives to a foamed plastic panel 71. Board 67 is secured to an inwardly directed flange 68 on side member 44 and flange 69 on end member 47. Side member 46 and end member 48 have flanges similar to flanges 68 and 69 for supporting bottom 66. A mat or panel 72 of glass fiber material is located over the top of panel 71. A metal foil skin 73, as aluminum foil, is secured to the upper side of mat 72. As shown in FIG. 3, mat 72 has an upwardly directed side section 74 that extends up to lip 51. End section 76, as a glass fiber mat, extends adjacent the inside the ends 47 and 48. Mat 72 and its side sections 74 and end sections 76 form the bottom, side, and end walls of a generally rectangular chamber 77 closed with light transparent cover 53.

A solar energy collector plate assembly indicated generally at 78 is located in chamber 77 and functions to absorb solar energy and transfer the energy in the form of heat to a fluid. Collector plate assembly 78, as shown in FIG. 2, is a generally rectangular structure corresponding generally to the length and width of chamber 77 has a plurality of side-by-side longitudinal plates 79-88. The plates 79-88 extend the length of the frame 43 and are associated in heat conductive relation with a plurality of elongated tubular members or tubes 89, 90, and 91 and additional tubes between adjacent plates. The tubes are preferably elongated metal tubes having a cylindrical outer surface. The tubes can be cylindrical tubes made of copper, aluminum, or similar heat conductive material. Opposite ends of the tubes are connected to transverse tubular manifolds or header tubes 93 and 94 supported on side members 44 and 46. The top surface of plates 79-88 are covered with a coating or layer 96 of energy absorbent material. Coating 96 is a black fiberlike substance that increases the effective surface area of the top of the plates. The coating 96 can be a black velvet solar coating sold under the trade name N-EX TEL by the 3M Company of St. Paul, Minn. Other types of solar energy coating materials, as black chrome, can be used.

Figure 5:
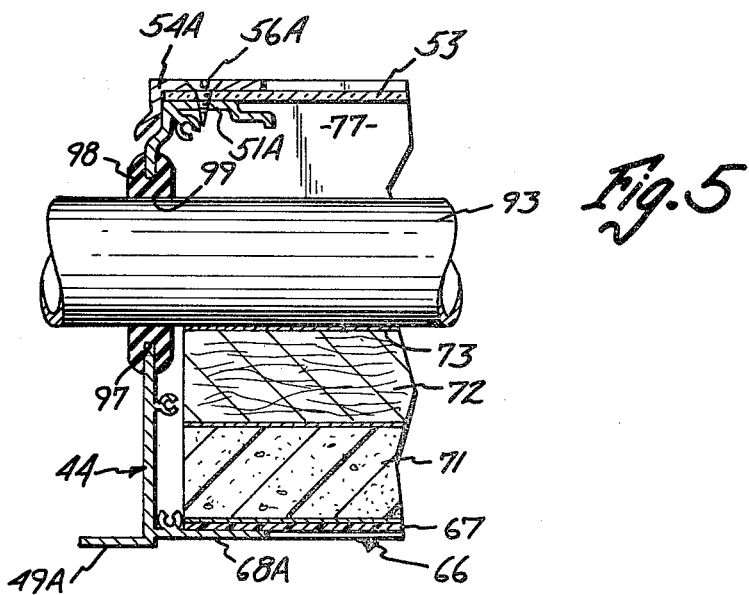
FIG. 5 is an enlarged sectional view taken along the line 5—5 of FIG. 2.

Referring to FIG. 5, side member 44 has a hole 97 supporting an annular grommet 98. Grommet 98 has a central hole 99 accommodating an end of manifold 93. The opposite end of manifold 93 extends through a grommet 101 mounted on side member 46. Opposite ends of manifold 94 extend through grommets 102 and 103 mounted on side members 44 and 46, respectively. Pipes 31 and 33 leading to the fluid circulating means are connected to one end of inlet manifold 94 of collector 11 and the opposite end of outlet manifold 93 of collector 12. Adjacent ends of manifolds 93 and 94 of adjacent collectors are connected together. The remaining ends of the manifolds are closed with caps (not shown).

Referring to FIGS. 6-10, there is shown the detailed structure of plate 79 of collector plate assembly 78. Plate 79, shown in FIGS. 6 and 7, has an elongated flat body 104 having a top surface 105 and first and second side sections along opposite sides of the body. The first side section has a longitudinal inverted C-shaped portion or rib 106 which extends along the left side of body 104. Rib 106 has a semi-circular shaped groove or pocket 107. An elongated linear flat flange 108 is integral with the outer edge of rib 106. Flange 108 is located in the horizontal plane of body 104. A downwardly directed hook 109 having an upwardly open hook end 111 providing a bottom of a longitudinal groove 112 is secured to body 104 adjacent rib 106. Lip 109 and hook 111 extends the length of body 104. Lip 109 projects downwardly and is normal with respect to the plane of body 104. Hook 111 projects upwardly toward pocket 107 and is spaced below body 104. Hook end 111 is generally vertically aligned with the inner edge of rib 106. Groove 112 is open toward pocket 107.

The second side section has a longitudinal portion or a downwardly stepped shoulder 113 attached to the right side of body 104. The outer edge of shoulder 113 is joined to a C-shaped member 114. C-shaped member 114 forms a semi-circular shaped longitudinal channel or pocket 116 having a generally semi-circular shape similar to pocket 107. A longitudinal lip 117 is joined to the outer edge of C-shaped member 114. Lip 117 forms a longitudinal rib, tongue, or male projection that is adapted to fit into groove 112 of an adjacent plate.

The entire plate 79 is a one-piece extruded metal member, such as aluminum, or similar heat conductive material. Plate 79 has a relatively thin generally uniform thickness. For example, plate 79 is an aluminum extrusion and has a thickness of 10 to 12 mm (0.05 inch).

The process of connecting adjacent plates 79 and 80 and locating a tube 90 between the adjacent plates is as follows. As shown in FIG. 8, tube 90 is initially placed in the groove of C-shaped member 114 of plate 80 with a lower arcuate section 118 of tube 90 located in surface engagement with the inside wall of C-shaped member 114.

FIG. 9 shows plate 79 being attached to plate 80. Lip 117 is placed in groove 112 between hook end 111 and the bottom of body 104. The upper arcuate surface 119 of tube 90 fits into pocket 107 and flange 108 is located adjacent shoulder 113. Plate 79 is moved upwardly in the direction of the arrow 122 to locate the surface 119 of tube 90 in surface engagement with the inside wall of rib 106.

As shown in FIG. 10, a screw 121 extended through flange 108 and shoulder 113, holds rib 106 and C-shaped member 114 in tight surface engagement with the tube 90. Tube 90 is in tight surface engagement with an equal amount of plates 79 and 80 so that about the same amount of heat energy is conducted to tube 90 from each plate. A heat conductive adhesive can be located between tube 90 and plates 79 and 80. Additional plates and tubes are connected in sequence until the plate assembly is completed, as shown in FIG. 2. Coating 96 is then placed on the upper sides of plates 79–88 to enhance solar energy absorbing characteristics of the plate assembly. Each tube receives heat energy from both plates holding the tube in substantially equal amounts, since the surfaces 118 and 119 in engagement with rib 106 and C-shaped member 114 are substantially equal.

A plurality of screws 121 are used to maintain adjacent plates in assembled relation about the fluid carrying tubes 89, 90, and 91 and additional tubes between adjacent plates. The bodies on the end plates have been separated from the rib and the C-shaped portion so that the tube 89, as shown in FIG. 3, can be located adjacent the side mat section 74. The upper ends of tubes 89–91 and remaining tubes are connected to manifold 93 so that the fluid moves through manifold 93 into the tubes between adjacent plates. The lower ends of tubes 89–91 and remaining tubes are connected to manifold 94 so that hot fluid moves from the tubes into manifold 94.

In use, pump 29 forces the fluid, such as a mixture of water and ethylene glycol, or similar non-freezing fluid, into manifold 93. The fluid flows through the longitudinal tubes located in surface engagement with the adjacent plates and into outlet manifold 94. The heat energy collected on the plates as a result of the solar energy is transferred to the tubes and the fluid moving in the tubes. The heated fluid moves into manifold 94 and to the heat storage and transfer tank 14 via the lines 33 and 36. Coil 24 in tank 14 transfers the heat to the water in tank 14 so that warm water is available to hot water tank 18. The conventional burner or electric heater functions to elevate the warm water to a selected temperature.

While there has been shown and described an embodiment of the solar collector and plate assembly therein, it is understood that changes in the size, shape, materials, and structure can be made by one skilled in the art without departing from the invention. The invention is defined in the following claims.

The embodiment of the invention in which an exclusive property or privilege is claimed is defined as follows:

1. In a solar energy collector having a frame, heat insulation means mounted thereon and forming the bottom, sides and ends of a chamber, cover means on said frame over the chamber of a material permitting solar energy to pass therethrough and into the chamber, solar energy collecting means mounted on the frame and located in the chamber to absorb energy for the sun and transmit heat energy to a liquid wherein the collecting means includes a plurality of plates disposed in side-by-side relation wherein said plates are similar and include respectively complementary laterally adjacent edges, a plurality of tubes mounted in engagement with the plates at their respective edges, and tubular inlet and outlet manifolds connected to the tubes for liquid flow therethrough for solar heating, the improvement comprising, each said plate having an extended planar central body between lateral edges thereof, one said lateral edge defining a first arcuate section disposed entirely on one side of said plate extending from a juncture with said central body and terminating in a planar flange which is substantially planar with said central body, and a hook extending from the other side of said plate and terminating in a laterally directed lip extending obliquely toward the concave face of said arcuate section, the other said lateral edge of said central body defining a substantially planar offset step on the opposite side of said plate from said first arcuate section, said planar step merging into a second arcuate section disposed entirely on said other side of the plate and terminating in a hook substantially coplanar with said offset portion, said hook havng a lip extending obliquely outwardly from said plate, said plate including said body portion, said arcuate sections, and said step comprising thin sheet material of substantially uniform thickness, each said tube is received in one of said arcuate sections wherein said oblique hooks permit swinging movement of a complementary arcuate section of another said plate into overlying relation with said tube to substantially entirely enclose the same within said thin walls of the plates, thereby to maximize heat transfer between said thin plates and said tubes, said arcuate section of adjacent plates surrounding said tube and so disposed as to locate the tube in an outwardly extending position with respect to each side of said plate thereby to further maximize heat transfer, and means securing said terminal flange on one plate to said step section on said other plate.

2. The improved solar energy collector of claim 1 further including coating means of solar energy absorbing material on said plate.

3. The improved solar energy collector of claims 1 or 2 wherein said plate is made of metal.

* * * * *

UNITED STATES PATENT AND TRADEMARK OFFICE
CERTIFICATE OF CORRECTION

PATENT NO. : 4,338,921
DATED : July 13, 1982
INVENTOR(S) : Willard J. Harder

It is certified that error appears in the above-identified patent and that said Letters Patent are hereby corrected as shown below:

Column 3, line 11, after "bar" insert -- 54 --.

Column 6, line 4, "for" should be -- from --.

Column 6, line 31, "havng" should be -- having --.

Signed and Sealed this

Seventh Day of September 1982

[SEAL]

Attest:

GERALD J. MOSSINGHOFF

Attesting Officer

Commissioner of Patents and Trademarks